(12) United States Patent
Xi et al.

(10) Patent No.: US 11,362,787 B2
(45) Date of Patent: Jun. 14, 2022

(54) PHASE TRACKING REFERENCE SIGNAL ASSOCIATION INDICATION AND TRANSMISSION METHOD, NETWORK DEVICE AND TERMINAL

(71) Applicant: VIVO MOBILE COMMUNICATION CO., LTD., Guangdong (CN)

(72) Inventors: Wei Xi, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 106 days.

(21) Appl. No.: 16/959,931

(22) PCT Filed: Dec. 27, 2018

(86) PCT No.: PCT/CN2018/124238
§ 371 (c)(1),
(2) Date: Jul. 2, 2020

(87) PCT Pub. No.: WO2019/137225
PCT Pub. Date: Jul. 18, 2019

(65) Prior Publication Data
US 2021/0075570 A1    Mar. 11, 2021

(30) Foreign Application Priority Data

Jan. 11, 2018 (CN) .......................... 201810028278.8
Feb. 14, 2018 (CN) .......................... 201810151803.5

(51) Int. Cl.
*H04L 5/00* (2006.01)
*H04W 72/04* (2009.01)

(52) U.S. Cl.
CPC .......... *H04L 5/0048* (2013.01); *H04L 5/0007* (2013.01); *H04W 72/0413* (2013.01)

(58) Field of Classification Search
None
See application file for complete search history.

(56) References Cited

U.S. PATENT DOCUMENTS

2014/0314000 A1   10/2014  Liu et al.
2018/0331699 A1*  11/2018  Lin ....................... H04L 1/0071
(Continued)

FOREIGN PATENT DOCUMENTS

CN    104579595 A    4/2015
CN    105122871 A    12/2015
WO    2017/138871 A1  8/2017

OTHER PUBLICATIONS

"3rd Generation Partnership Project; Technical Specification Group Radio Access Network; NR; Multiplexing and channel coding" 3GPP TS 38.212 V15.0.0, (Dec. 2017).
(Continued)

*Primary Examiner* — Hassan A Phillips
*Assistant Examiner* — Gautam Sharma
(74) *Attorney, Agent, or Firm* — Maschoff Brennan

(57) ABSTRACT

Embodiments of the present disclosure provide a PTRS association indication method, a PTRS transmission method, a network device and a terminal. The PTRS association indication method includes: transmitting indication information to a terminal, the indication information being used to indicate information of a DMRS port to the terminal, the DMRS port being associated with a PTRS port in uplink transmission using a CP-OFDM waveform.

17 Claims, 4 Drawing Sheets

(56) References Cited

U.S. PATENT DOCUMENTS

| | | | | |
|---|---|---|---|---|
| 2018/0367277 | A1* | 12/2018 | Zhang | H04L 5/0048 |
| 2019/0140729 | A1* | 5/2019 | Zhang | H04B 7/0669 |
| 2019/0158171 | A1* | 5/2019 | Ren | H04B 7/0663 |
| 2019/0215118 | A1* | 7/2019 | Moles Cases | H04L 41/0803 |
| 2020/0052944 | A1* | 2/2020 | Zhang | H04L 27/2611 |
| 2020/0076557 | A1* | 3/2020 | Sun | H04L 5/0048 |
| 2020/0120610 | A1* | 4/2020 | Chen | H04W 52/16 |
| 2020/0177416 | A1* | 6/2020 | Jiang | H04L 5/10 |
| 2021/0044400 | A1* | 2/2021 | Jiang | H04B 7/0639 |
| 2021/0075570 | A1* | 3/2021 | Xi | H04W 72/0413 |

OTHER PUBLICATIONS

"PTRS for CP-OFDM" 3GPP TSG RAN WG1 Meeting #89, May 15, 2017.

Written Opinion and International Search Report in Application No. PCT/CN2018/124238 dated Jul. 23, 2020.

CN Office Action in Application No. 201810151803.5 dated Mar. 5, 2021.

"Discussion on explicit and implicit signaling for PT-RS", National Instruments, 3GPP TSG RAN WG1 Meeting #89, R1-1708272, May 15, 2017.

* cited by examiner transmitting indication information to a terminal, the indication information being used to indicate information of a DMRS ports associated with a PTRS port in uplink transmission using a CP-OFDM waveform to the terminal — 21

PHASE TRACKING REFERENCE SIGNAL ASSOCIATION INDICATION AND TRANSMISSION METHOD, NETWORK DEVICE AND TERMINAL

CROSS-REFERENCE TO RELATED APPLICATION

The present application is the U.S. national phase of PCT Application No. PCT/CN2018/124238 filed on Dec. 17, 2018, which claims priorities of the Chinese patent application No. 201810028278.8 filed in China on Jan. 11, 2018 and the Chinese patent application No. 201810151803.5 filed in China on Feb. 14, 2018, which are incorporated herein by reference in their entireties.

TECHNICAL FIELD

The present disclosure relates to the field of wireless communication technology, in particular to a Phase Tracking Reference Signal (PTRS) association indication method, a PTRS transmission method, a network device, and a terminal.

BACKGROUND

In a future-oriented $5^{th}$-Generation (5G) mobile communication system, in order to achieve a downlink transmission rate of 20 Gbps and an uplink transmission rate of 10 Gbps, a high-frequency transmission technology and a massive antenna array technology have attracted more and more attentions.

Abundant spectrum resources are provided at a high-frequency band, but a transmission distance is limited due to large attenuation. Although a massive antenna array may provide a relatively large beamforming gain, usually an antenna aperture is large. Hence, the two may be combined together. The aperture of the massive antenna array may be reduced due to a short-wavelength characteristic of the high-frequency band, so it is able to achieve the dense deployment of antennae in an easier and more feasible manner. Meanwhile, a high-frequency transmission loss may be effectively reduced due to the large beamforming gain generated by the massive antenna array, so it is able to remarkably extend the transmission distance for the high-frequency transmission. Thus, the high-frequency transmission technology and the massive antenna array technology may supplement each other, and implement complementary advantages, and the combination thereof has become a trend.

Usually, in order to improve the transmission effectiveness, higher-order modulation, e.g., 16 Quadrature Amplitude Modulation (QAM), 64QAM or 256QAM, is adopted. However, the higher-order modulation is usually susceptible to phase noise. In addition, with the increase of the modulation order, it is more sensitive to the phase noise, and even worse, the higher the operating frequency, the larger the phase noise. Hence, in order to eliminate the phase noise during the high-frequency transmission, a transmitter needs to transmit a known reference signal to a receiver, i.e., the PTRS, and the receiver may estimate the phase noise in accordance with the PTRS and then perform corresponding phase compensation. Generally, a frequency-domain density of the PTRS depends on a bandwidth allocated to the receiver, i.e., the quantity of Physical Resource Blocks (PRBs). For example, one PTRS subcarrier may be inserted every two or four resource blocks. The time-domain density is associated with a Modulation Coding Scheme (MCS) of a data symbol, e.g., one PTRS symbol may be inserted every one, two or four Orthogonal Frequency Division Multiplexing (OFDM) symbols.

When a plurality of DeModulation Reference Signal (DMRS) ports is Quasi-Co-Located (QCL), the phase noises of corresponding data streams are the same, so these DMRS ports may share one PTRS port. At this time, the PTRS port needs to be transmitted on one of the corresponding DMRS ports, i.e., the PTRS port is associated or mapped to the DMRS port. In order to improve the estimation accuracy of the phase noise, the transmitter needs to map the PTRS port to one DMRS port of the corresponding QCL DMRS ports which has a best channel condition, and the receiver needs to know the DMRS port where the PTRS is located, otherwise, it is impossible to estimate the phase noise in accordance with the PTRS. Hence, it is necessary to indicate, explicitly or implicitly, the DMRS port where the PTRS is located.

During the downlink transmission, a set of a plurality of QCL DMRS ports is called as a DMRS port group. In other words, the DMRS ports in a same DMRS port group are QCL, and the DMRS ports in different DMRS port groups are not QCL. Based on a current $3^{rd}$-Generation Partnership Project (3GPP) standardization progress, for single-codeword transmission, the PTRS is mapped to a DMRS port with a minimum port serial number, and for double-codeword transmission, the PTRS is mapped to a DMRS port with a minimum port serial number in a plurality of DMRS ports corresponding to a codeword with a higher MCS order.

During the uplink transmission, a Discrete Fourier Transformation-Spreading-Orthogonal Frequency Division Multiplexing (DFT-S-OFDM) waveform and a Cyclic Prefix-Orthogonal Frequency Division Multiplexing (CP-OFDM) waveform are adopted by a New Radio (NR) system. The DFT-S-OFDM is merely used for single-stream transmission, so when the PTRS needs to be transmitted, it is merely necessary to map the PTRS port to a unique DMRS port. For the CP-OFDM, although similar to that in the downlink transmission, there is currently no scheme for determining the DMRS port to which the shared PTRS port has been mapped in the plurality of corresponding QCL DMRS ports.

SUMMARY

In a first aspect, the present disclosure provides in some embodiments a PTRS association indication method for a network device, including transmitting indication information to a terminal, the indication information being used to indicate information of a DMRS port associated with a PTRS port in uplink transmission using a CP-OFDM waveform to the terminal.

In a second aspect, the present disclosure provides in some embodiments a PTRS transmission method for a terminal, including: acquiring information of a DMRS port associated with a PTRS port in uplink transmission using a CP-OFDM waveform; and transmitting data for the PTRS port on the DMRS port associated with the PTRS port in the uplink transmission using the CP-OFDM waveform.

In a third aspect, the present disclosure provides in some embodiments a network device, including a transmission module used to transmit indication information to a terminal, the indication information being used to indicate information of a DMRS port associated with a PTRS port in uplink transmission using a CP-OFDM waveform to a terminal.

In a fourth aspect, the present disclosure provides in some embodiments a terminal, including: an acquisition module used to acquire information of a DMRS port associated with a PTRS port in uplink transmission using a CP-OFDM waveform; and a transmission module used to transmit data for the PTRS port on the DMRS port associated with the PTRS port in the uplink transmission using the CP-OFDM waveform.

In a fifth aspect, the present disclosure provides in some embodiments a network device, including a processor, a memory, and a computer program stored in the memory and capable of being executed by the processor. The processor is used to execute the computer program to implement the above-mentioned PTRS association indication method.

In a sixth aspect, the present disclosure provides in some embodiments a terminal, including a processor, a memory, and a computer program stored in the memory and capable of being executed by the processor. The processor is used to execute the computer program to implement the above-mentioned PTRS transmission method.

In a seventh aspect, the present disclosure provides in some embodiments a computer-readable storage medium storing therein a computer program. The computer program is capable of being executed by a processor to implement the above-mentioned PTRS association indication method for the network device.

In an eighth aspect, the present disclosure provides in some embodiments a computer-readable storage medium storing therein a computer program. The computer program is capable of being executed by a processor to implement the above-mentioned PTRS transmission method for the terminal.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may obtain the other embodiments, all of which also fall within the scope of the present disclosure.

Figures 1, 2:
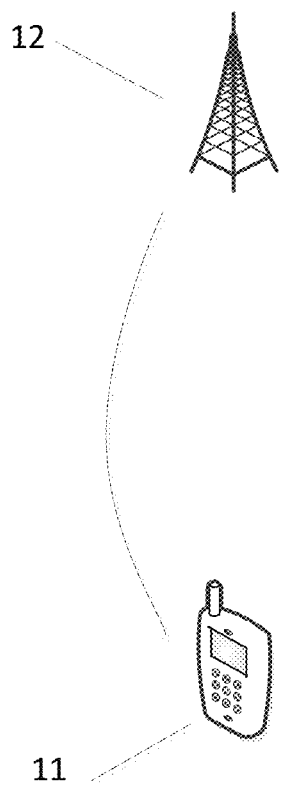
FIG. 1 is a schematic view showing a network system where embodiments of the present disclosure are applicable.
FIG. 2 is a flow chart of a PTRS association indication method according to the embodiments of the present disclosure.

FIG. 1 is a schematic view showing a network system where an embodiment of the present disclosure is applicable. As shown in FIG. 1, the network system includes a terminal 11 and a network device 12. The terminal 11 may be a User Equipment (UE), e.g., mobile phone, tablet personal computer, laptop computer, Personal Digital Assistant (PDA), Mobile Internet Device (MID) or wearable device. It should be appreciated that, a specific type of the terminal 11 will not be particularly defined herein. The network device 12 may be a 5th-Generation (5G) (or later) network device (e.g., gNB, 5G New Radio (NR) Node B (NB)), or a base station in another communication system; it may also be called as Node B, evolved Node B, or another name in the art. In other words, the network device may not be limited to a specific name, as long as a same technical effect is achieved. It should be appreciated that, in the embodiments of the present disclosure, the 5G base station is taken as an example, but a specific type of the network device 12 may not be limited thereto.

It should be appreciated that, a communication device in the embodiments of the present disclosure may be the terminal 11 or the network device 12, and functions of the communication device will be described hereinafter in conjunction with the embodiments.

As shown in FIG. 2, the present disclosure provides in some embodiments a PTRS association indication method for a network device, which includes Step 21 of transmitting indication information to a terminal, the indication information being used to indicate information of a DMRS port associated with a PTRS port in uplink transmission using a CP-OFDM waveform to the terminal.

The DMRS port associated with the PTRS port may be just a DMRS port for the transmission of data for the PTRS port, and in the embodiments of the present disclosure, it may also be called as a DMRS port to which the PTRS port is mapped.

According to the embodiments of the present disclosure, the network device may transmit the indication information to the terminal, and the indication information may be used to indicate the information of the DMRS port associated with the PTRS port in the uplink transmission using the CP-OFDM waveform to the terminal, so that the terminal may transmit the data of the PTRS port on the DMRS port associated with the PTRS port and indicated by the network device in the uplink transmission using the CP-OFDM waveform. As a result, it is able for the network device to accurately acquire the DMRS port for the transmission of a PTRS and receive the PTRS via the DMRS port, thereby to accurately estimate a phase noise.

In the embodiments of the present disclosure, the information of the DMRS port associated with the PTRS port may include a serial number of the DMRS port associated with each PTRS port. Naturally, apart from the serial number, the DMRS port may also be indicated using the other information, e.g., a serial number of a certain data layer in the uplink transmission.

In the embodiments of the present disclosure, when different transmission modes are adopted for the uplink transmission, the indication information may be transmitted to the terminal in different indication modes.

In some embodiments of the present disclosure, when the uplink transmission is non-codebook-based transmission, the network device may transmit a correspondence between Sounding Reference Signals (SRS) resources and PTRS ports to the terminal through high-layer signaling, e.g., Radio Resource Control (RRC) signaling.

The transmitting the indication information to the terminal may include, when the PTRS ports corresponding to at least two SRS resources are a same one PTRS port, transmitting the indication information to the terminal.

With respect to a non-codebook-based transmission mode, in the embodiments of the present disclosure, the network device may configure a PTRS port serial number for each configured SRS resource through the RRC signaling, i.e., configure the correspondence between the SRS resources and the PTRS ports. The quantity of the PTRS ports may also be configured by the network device for the terminal through the RRC signaling. Usually, the SRS resources correspond to the DMRS ports. When the PTRS ports corresponding to a plurality of SRS resources are one PTRS port with a same serial number, the PTRS port may be shared by the DMRS ports corresponding to these SRS resources. When one PTRS port is shared by at least two DMRS ports, the indication information needs to be transmitted to the terminal, so as to indicate the information of the DMRS ports associated with the PTRS port in the uplink transmission using the CP-OFDM waveform to the terminal, i.e., indicate the DMRS ports for transmitting the PTRS port in the uplink transmission using the CP-OFDM waveform to the terminal.

To be specific, in the embodiments of the present disclosure, when the PTRS ports corresponding to at least two SRS resources are the same one PTRS port, the transmitting the indication information to the terminal may include one of: (1) when the quantity of the PTRS ports is 1 and the quantity of the DMRS ports is 2, transmitting the indication information to the terminal through one bit; (2) when the quantity of the PTRS ports is 2 and the quantity of the DMRS ports is 2, not transmitting the indication information to the terminal; (3) when the quantity of the PTRS ports is 1 and the quantity of the DMRS ports is 4, transmitting the indication information to the terminal through two bits; and (4) when the quantity of the PTRS ports is 2 and the quantity of the DMRS ports is 4, transmitting the indication information to the terminal through two bits.

With respect to the above mode (1) in the embodiments of the present disclosure, when the quantity of the PTRS ports is 1 and the quantity of the DMRS ports is 2, it should be appreciated that, the PTRS port may be shared by the two DMRS ports. Because the quantity of the DMRS ports is merely two, the information of the DMRS ports associated with the PTRS port may be transmitted to the terminal merely through one bit.

With respect to the above mode (2) in the embodiments of the present disclosure, when the quantity of the PTRS ports is 2 and the quantity of the DMRS ports is 2, it should be appreciated that, each PTRS port may correspond to a respective one DMRS port, so it is unnecessary to transmit the indication information to the terminal, so as to reduce the downlink signaling overhead.

With respect to the above mode (3) in the embodiments of the present disclosure, when the quantity of the PTRS ports is 1 and the quantity of the DMRS ports is 4, it should be appreciated that, the four DMRS ports may share one PTRS port, and at this time, it is necessary to transmit the indication information to the terminal through two bits, so as to indicate the information of the DMRS ports associated with the PTRS port.

With respect to the above mode (4) in the embodiments of the present disclosure, when the quantity of the PTRS ports is 2 and the quantity of the DMRS ports is 4, it should be appreciated that, two or three DMRS ports need to share one PTRS port, so it is necessary to transmit the indication information to the terminal through two bits, so as to indicate the information of the DMRS ports associated with the PTRS ports.

In some other embodiments of the present disclosure, when the uplink transmission is codebook-based transmission, the transmitting the indication information to the terminal may include: transmitting the correspondence between the PTRS ports and the DMRS ports to the terminal through a Transmit Precoding Matrix Indicator (TPMI) and a Transmit Rank Indicator (TRI); and transmitting the indication information to the terminal in accordance with the TPMI and the TRI.

With respect to the codebook-based transmission mode, in the embodiments of the present disclosure, the network device may indicate the correspondence between the PTRS ports and the DMRS ports through the TPMI and the TRI jointly.

The uplink transmission may include three types, i.e., full-coherent transmission, semi-coherent transmission and non-coherent transmission. For the full-coherent transmission, merely one uplink PTRS port needs to be provided, i.e., when one terminal reports to the network device that it is capable of supporting the full-coherent transmission, the network device may configure merely one PTRS port for the terminal. For the semi-coherent transmission and the non-coherent transmission, a plurality of uplink PTRS ports needs to be provided.

Moreover, the selection of the TPMI may be limited by the network device in accordance with a capability of the terminal. For example, for the terminal that supports the full-coherent transmission, during the selection of the TPMI for the terminal, the network device may take all codewords in a codebook into consideration. For the terminal that supports only the semi-coherent transmission or the non-coherent transmission, during the selection of the TPMI for the terminal, the network device may perform the selection in only parts of the codewords in the codebook (e.g., corresponding to the TPMI selected by an antenna).

To be specific, in the embodiments of the present disclosure, the transmitting the indication information to the terminal in accordance with the TPMI and the TRI may include, when the TRI is 1, not transmitting the indication information to the terminal.

When the TRI is 1, it means that there is merely one DMRS port, and the PTRS port may be mapped to the unique DMRS port. Hence, it is unnecessary to transmit the indication information to the terminal through an additional bit, thereby to reduce the downlink signaling overhead.

As mentioned above, the uplink transmission includes the full-coherent transmission, the semi-coherent transmission and the non-coherent transmission, so with respect to the terminals that support different transmission types, the indication information may be transmitted to the terminals in different ways, which will not be illustratively described hereinafter.

With respect to the terminal that supports the full-coherent transmission, the transmitting the indication information to the terminal in accordance with the TPMI and the TRI may include one of: (1) when the TRI is 2, transmitting the indication information to the terminal through one bit; and (2) when the TRI is 3 or 4, transmitting the indication information to the terminal through two bits. For the terminal that supports the full-coherent transmission, the quantity of the PTRS ports may be 1.

In the mode (1) of the embodiments of the present disclosure, when the TRI is 2, it means that there are two DMRS ports, so the indication information may be transmitted to the terminal through one bit, so as to indicate the information of the DMRS ports associated with the PTRS port.

In addition, in this mode, the quantity of transmission antennae may be 2 or 4. When the quantity of the transmission antennae is 2, the TPMI may be 0, 1 or 2, and when the quantity of the transmission antennae is 4, the TPMI may be 0, 1, . . . , or 21.

In the mode (2) of the embodiments of the present disclosure, when the TRI is 3 or 4, it means that there are three or four DMRS ports, so the indication information needs to be transmitted to the terminal through two bits, so as to indicate the information of the DMRS ports associated with the PTRS port.

In addition, in this mode, the quantity of the transmission antennae may be 4. When the TRI is 3 and the quantity of the transmission antennae is 4, the TPMI may be 0, 1, . . . , or 6, and when the TRI is 4 and the quantity of the transmission antennae is 4, the TPMI may be 0, 1, . . . , or 4.

With respect to the terminal that supports the semi-coherent transmission or the non-coherent transmission, the transmitting the indication information to the terminal in accordance with the TPMI and the TRI may include one of: (1) when the quantity Tx of the transmission antennae is 2, the TRI is 2, the TPMI is 0 and the quantity of the PTRS ports is 2, not transmitting the indication information to the terminal; (2) when the quantity Tx of the transmission antennae is 4, the TRI is 2, the TPMI is 0, 2, 3, 5, 6, 7, 8, 9, 10, 11, 12 or 13 and the quantity of the PTRS ports is 2, not transmitting the indication information to the terminal; (3) when the quantity Tx of the transmission antennae is 4, the TRI is 2, the TPMI is 1 or 4 and the quantity of the PTRS ports is 1, transmitting the indication information to the terminal through one bit; (4) when the quantity Tx of the transmission antennae is 4, the TRI is 3, the TPMI is 0, 1 or 2, and the quantity of the PTRS ports is 2, transmitting the indication information to the terminal through one bit; and (5) when the quantity Tx of the transmission antennae is 4, the TRI is 4, the TPMI is 0, 1 or 2, and the quantity of the PTRS ports is 2, transmitting the indication information to the terminal through two bits.

In the mode (1) of the embodiments of the present disclosure, when the quantity Tx of the transmission antennae is 2, the TRI is 2, the TPMI is 0 and the quantity of the PTRS ports is 2, it means that there are two DMRS ports corresponding to the PTRS ports respectively. At this time, it is unnecessary to transmit the indication information to the terminal through an additional bit.

In the mode (2) of the embodiments of the present disclosure, when the quantity Tx of the transmission antennae is 4, the TRI is 2, the TPMI is 0, 2, 3, 5, 6, 7, 8, 9, 10, 11, 12 or 13, and the quantity of the PTRS ports is 2, it means that there are two DMRS ports corresponding to the PTRS ports respectively, so it is unnecessary to transmit the indication information to the terminal through an additional bit.

In the mode (3) of the embodiments of the present disclosure, when the quantity Tx of the transmission antennae is 4, the TRI is 2, the TPMI is 1 or 4 and the quantity of the PTRS ports is 1, it means that there are two DMRS ports sharing the PTRS port. Hence, it is necessary to transmit the indication information to the terminal through one bit, so as to indicate the information of the DMRS ports associated with the PTRS port.

In the mode (4) of the embodiments of the present disclosure, when the quantity Tx of the transmission antennae is 4, the TRI is 3, the TPMI is 0, 1, or 2, and the quantity of the PTRS ports is 2, it means that there are three DMRS ports, and two of the three DMRS ports may share one PTRS port. Hence, it is necessary to transmit the indication information to the terminal through one bit, so as to indicate the information of the DMRS ports associated with the PTRS port.

In the mode (5) of the embodiments of the present disclosure, when the quantity Tx of the transmission antennae is 4, the TRI is 4, the TPMI is 0, 1 or 2, and the quantity of the PTRS ports is 2, it means that there are four DMRS ports, and two or three of the four DMRS ports may share one PTRS port. Hence, it is necessary to transmit the indication information to the terminal through two bits, so as to indicate the information of the DMRS ports associated with the PTRS ports.

For another example, when the uplink transmission is codebook-based transmission, the transmitting the indication information to the terminal may include transmitting the correspondence between the PTRS ports and the DMRS ports to the terminal in accordance with the quantity of SRS ports, the quantity of the PTRS ports, and the quantity of supported maximum transmission layers.

In this case, when the quantity of the supported maximum transmission layers is 1, it is unnecessary to indicate mapping of the PTRS ports through an additional bit, which will be described hereinafter in two circumstances.

With respect to the terminal that supports the full-coherent transmission, the transmitting the correspondence between the PTRS ports and the DMRS ports to the terminal in accordance with the quantity of the SRS ports and the quantity of the supported maximum transmission layers and transmitting the indication information to the terminal may include at least one of: when the quantity of the PTRS ports is 1 and the quantity of the supported maximum transmission layers is 2, transmitting the indication information to the terminal through one bit; and when the quantity of the PTRS ports is 1 and the quantity of the supported maximum transmission layers is 3 or 4, transmitting the indication information to the terminal through two bits.

On the other hand, with respect to the terminal that supports the semi-coherent transmission or the non-coherent transmission, the transmitting the correspondence between the PTRS ports and the DMRS ports to the terminal in accordance with the quantity of the SRS ports, the quantity of the PTRS ports, and the quantity of the supported maximum transmission layers and transmitting the indication information to the terminal may include at least one of: when the quantity of the PTRS ports is 2, the quantity of the SRS ports is 2, and the quantity of the supported maximum transmission layers is 2, not indicating the mapping of the PTRS ports through an additional bit; when the quantity of the PTRS ports is 2, the quantity of the SRS ports is 4, and the quantity of the supported maximum transmission layers is 2, not indicating the mapping of the PTRS ports through an additional bit; when the quantity of the PTRS ports is 1, the quantity of the SRS ports is 4, and the quantity of the supported maximum transmission layers is 2, transmitting the indication information to the terminal through one bit; when the quantity of the PTRS ports is 2, the quantity of the SRS ports is 4, and the quantity of the supported maximum transmission layers is 3, transmitting the indication information to the terminal through one bit; and when the quantity of the PTRS ports is 2, the quantity of the SRS ports is 4, and the quantity of the supported maximum transmission layers is 4, transmitting the indication information to the terminal through two bits.

In the embodiments of the present disclosure, the transmitting the indication information to the terminal may include transmitting the indication information to the terminal through Downlink Control Information (DCI).

To be specific, a PTRS port mapping indication field (e.g., PTRS-portMapping-Indicator-nCB) may be introduced into the DCI so as to indicate the information of the DMRS port associated with the PTRS port.

The PTRS association indication method will be described hereinafter in conjunction with specific embodiments.

First Embodiment

In this embodiment, in the non-codebook-based uplink transmission using the CP-OFDM waveform, the network device may configure a serial number of one PTRS port for each SRS resource. When the PTRS ports corresponding to a plurality of SRS resources are one PTRS port with a same serial number, the DMRS ports corresponding to these SRS resources may share (i.e., correspond to) the PTRS port. When there is more than one DMRS port corresponding to the PTRS port, the indication information may be transmitted to the terminal, so as to indicate the information of the DMRS port associated with the PTRS port.

In this embodiment, a PTRS port mapping indication field (e.g., PTRS-portMapping-Indicator-nCB) may be introduced into the DCI so as to indicate the information of the DMRS port associated with the PTRS port, as shown in Table 1.

serial number of the DMRS port associated with the PTRS port; (2) when the quantity of the PTRS ports is 2 and the quantity of the DMRS ports is 2, not transmitting the indication information to the terminal; when PTRS-portMapping-Indicator-nCB is "–", it means that it is unnecessary to indicate the serial number of the DMRS port associated with the PTRS port through an additional bit; (3) when the quantity of the PTRS ports is 1 and the quantity of the DMRS ports is 4, transmitting the indication information to the terminal through two bits (00, 01, 10 or 11), so as to indicate the serial number of the DMRS port associated with the PTRS port; and (4) when the quantity of the PTRS ports is 2 and the quantity of the DMRS ports is 4, transmitting the indication information to the terminal through two bits (00, 01, 10 or 11), so as to indicate the serial number of the DMRS port associated with the PTRS port.

In Table 1, when the quantity of the PTRS ports is 2 and the serial numbers of the DMRS ports (data layers) to which the PTRS ports are mapped are the DMRS ports corresponding to the first and second data layers, a PTRS port 0 may correspond to the DMRS port corresponding to the first data layer, and a PTRS port 1 may correspond to the DMRS port corresponding to the second data layer. In other words, an order of the serial numbers of the data layers in the table may correspond to an order of the PTRS ports. The other situations may be similar, and thus will not be particularly defined herein.

Second Embodiment

In this embodiment, in the non-codebook-based transmission using the CP-OFDM, for the terminal that supports the

TABLE 1

| The quantity of PTRS ports | The quantity of data layers (i.e., the quantity of DMRS ports) | PTRS-portMapping-Indicator-nCB | Serial number of DMRS port (data layer) to which the PTRS port is mapped |
|---|---|---|---|
| 1 | 2 | 0 | DMRS port corresponding to a first data layer |
|   |   | 1 | DMRS port corresponding to a second data layer |
|   | 4 | 00 | DMRS port corresponding to the first data layer |
|   |   | 01 | DMRS port corresponding to the second data layer |
|   |   | 10 | DMRS port corresponding to a third data layer |
|   |   | 11 | DMRS port corresponding to a fourth data layer |
| 2 | 2 | — | DMRS ports corresponding to the first and second data layers |
|   | 4 | 00 | DMRS ports corresponding to the first and third data layers |
|   |   | 01 | DMRS ports corresponding to the first and fourth data layers |
|   |   | 10 | DMRS ports corresponding to the second and third data layers |
|   |   | 11 | DMRS ports corresponding to the second and fourth data layers |

As shown in Table 1, the transmitting the indication information to the terminal may include: (1) when the quantity of the PTRS ports is 1 and the quantity of the DMRS ports is 2, transmitting the indication information to the terminal through one bit (0 or 1), so as to indicate the full-coherent transmission, the quantity of the PTRS ports may be 1, and a PTRS port mapping indication field (e.g., PTRS-portMapping-Indicator-CB) may be introduced into the DCI so as to indicate the information of the DMRS port associated with the PTRS port, as shown in Table 2.

TABLE 2

| RI | The quantity of transmission antennae | TPMI | PTRS-portMapping-Indicator-CB | Serial number of DMRS port (data layer) to which the PTRS port is mapped |
|---|---|---|---|---|
| | 2 | 0-2 | 0 | DMRS port corresponding to a first data layer |
| | | | 1 | DMRS port corresponding to a second data layer |
| | 4 | 0-21 | 0 | DMRS port corresponding to the first data layer |
| | | | 1 | DMRS port corresponding to the second data layer |
| | 4 | 0-6 | 00 | DMRS port corresponding to the first data layer |
| | | | 01 | DMRS port corresponding to the second data layer |
| | | | 10 | DMRS port corresponding to a third data layer |
| | 4 | 0-4 | 00 | DMRS port corresponding to the first data layer |
| | | | 01 | DMRS port corresponding to the second data layer |
| | | | 10 | DMRS port corresponding to the third data layer |
| | | | 11 | DMRS port corresponding to a fourth data layer |

In other words, with respect to the terminal that supports the full-coherent transmission, the transmitting the indication information to the terminal may include one of the following steps.

(1) When the TRI is 2, transmitting the indication information to the terminal through one bit, so as to indicate the serial number of the DMRS port associated with the PTRS port. In this mode, the quantity of the transmission antennae may be 2 or 4. When the quantity of the transmission antennae is 2, the TPMI may be 0, 1 or 2, and when the quantity of the transmission antennae is 4, the TPMI may be 0, 1, . . . , or 21.

(2) When the TRI is 3 or 4, transmitting the indication information to the terminal through two bits, so as to indicate the serial number of the DMRS port associated with the PTRS port. In this mode, the quantity of the transmission antennae may be 4. When the TRI is 3 and the quantity of the transmission antennae is 4, the TPMI may be 0, 1, . . . , or 6, and when the TRI is 4 and the quantity of the transmission antennae is 4, the TPMI may be 0, 1, . . . , or 4.

With respect to the terminal that merely supports the non-coherent transmission or semi-coherent transmission, a PTRS port mapping indication field (e.g., PTRS-portMapping-Indicator-CB) may be introduced into the DCI, so as to indicate the information of the DMRS port associated with the PTRS port, as shown in Table 3.

TABLE 3

| The quantity of transmission antennae | RI | TPMI | The quantity of PTRS ports | PTRS-portMapping-Indicator-CB | Serial number of DMRS port (data layer) to which the PTRS port is mapped |
|---|---|---|---|---|---|
| 2 | | 0 | 2 | — | DMRS ports corresponding to first and second data layers |
| 4 | | Non-coherent transmission: 0, 2, 3, 5 Semi-coherent transmission: 6-13 | 2 | — | DMRS ports corresponding to the first and second data layers |
| | | Non-coherent transmission: 1, 4 | 1 | 0 | DMRS port corresponding to the first data layer |
| | | | | 1 | DMRS port corresponding to the second data layer |
| | | 0 (non-coherent transmission) | 2 | 0 | DMRS ports corresponding to the first and second data layers |
| | | | | 1 | DMRS ports corresponding to third and second data layers |
| | | 1, 2 (semi-coherent transmission) | 2 | 0 | DMRS ports corresponding to the first and second data layers |
| | | | | 1 | DMRS ports corresponding to the first and third data layers |
| | | 0 (non-coherent transmission) | 2 | 00 | DMRS ports corresponding to the first and second data layers |
| | | | | 01 | DMRS ports corresponding to first and fourth data layers |
| | | | | 10 | DMRS ports corresponding to the third and second data layers |

TABLE 3-continued

| The quantity of transmission antennae | RI | TPMI | The quantity of PTRS ports | PTRS-portMapping-Indicator-CB | Serial number of DMRS port (data layer) to which the PTRS port is mapped |
|---|---|---|---|---|---|
| | | | | 11 | DMRS ports corresponding to the third and fourth data layers |
| | | 1, 2 (semi-coherent transmission) | 2 | 00 | DMRS ports corresponding to the first and third data layers |
| | | | | 01 | DMRS ports corresponding to the first and fourth data layers |
| | | | | 10 | DMRS ports corresponding to the second and third data layers |
| | | | | 11 | DMRS ports corresponding to the second and fourth data layers |

With respect to the terminal that supports the non-coherent transmission or semi-coherent transmission, the transmitting the indication information to the terminal may include: (1) when the quantity Tx of the transmission antennae is 2, the TRI is 2, the TPMI is 0 and the quantity of the PTRS ports is 2, it is unnecessary to transmit the indication information to the terminal through an additional bit; (2) when the quantity Tx of the transmission antennae is 4, the TRI is 2, the TPMI is 0, 2, 3, 5, 6, 7, 8, 9, 10, 11, 12 or 13 (the TPMI of 0, 2, 3, or 5 corresponds to the non-coherent transmission, and the TPMI of 6, 7, 8, 9, 10, 11, 12 or 13 corresponds to the semi-coherent transmission), and the quantity of the PTRS ports is 2, it is unnecessary to transmit the indication information to the terminal through an additional bit; (3) when the quantity Tx of the transmission antennae is 4, the TRI is 2, the TPMI is 1 or 4 (for the non-coherent transmission) and the quantity of the PTRS ports is 1, transmitting the indication information to the terminal through one bit, so as to indicate the serial number of the DMRS port associated with the PTRS port; (4) when the quantity Tx of the transmission antennae is 4, the TRI is 3, the TPMI is 0, 1 or 2 (the TPMI of 0 corresponds to the non-coherent transmission, and the TPMI of 1 or 2 corresponds to the semi-coherent transmission), and the quantity of the PTRS ports is 2, transmitting the indication information to the terminal through one bit, so as to indicate the serial number of the DMRS port associated with the PTRS port; and (5) when the quantity Tx of the transmission antennae is 4, the TRI is 4, the TPMI is 0, 1 or 2 (the TPMI of 0 corresponds to the non-coherent transmission, and the TPMI of 1 or 2 corresponds to the semi-coherent transmission), and the quantity of the PTRS ports is 2, transmitting the indication information to the terminal through two bits, so as to indicate the serial number of the DMRS port associated with the PTRS port.

In the above table, when the quantity of the PTRS ports is 2 and the serial numbers of the DMRS ports (data layers) to which the PTRS ports are mapped are the DMRS ports corresponding to the third and second data layers, a PTRS port 0 may correspond to the DMRS port corresponding to the third data layer, and a PTRS port 1 may correspond to the DMRS port corresponding to the second data layer. In other words, an order of the serial numbers of the data layers in the table may correspond to an order of the PTRS ports, because in the protocol, SRS ports 0 and 2 share the PTRS port 0, and SRS ports 1 and 3 share the PTRS port 1. The other situations may be similar, and thus will not be particularly defined herein.

In another possible embodiment of the present disclosure, when the quantity of the supported maxim transmission layers is 1, it is unnecessary to indicate the mapping of the PTRS ports though additional bits.

For the full-coherent transmission, when the quantity of the PTRS ports is 1, a PTRS port mapping indication field (e.g., PTRS-portMapping-Indicator-CB) may be introduced into the DCI, as shown in Table 4.

TABLE 4

| The quantity of SRS ports | The quantity of supported maximum transmission layers | The quantity of bits of PTRS-portMapping-Indicator-CB |
|---|---|---|
| 2 | 2 | 1 |
| 4 | 2 | 1 |
| | 3, 4 | 2 |

For the semi-coherent transmission or non-coherent transmission, a PTRS port mapping indication field (e.g., PTRS-portMapping-Indicator-CB) may be introduced into the DCI, as shown in Table 5.

TABLE 5

| The quantity of SRS ports | The quantity of supported maximum transmission layers | The quantity of PTRS ports | The quantity of bits of PTRS-portMapping-Indicator-CB |
|---|---|---|---|
| 2 | 2 | 2 | 0 |
| 4 | 2 | 2 | 0 |
|  |  | 1 | 1 |
|  | 3 | 2 | 1 |
|  | 4 | 2 | 2 |

As shown in Table 4 and Table 5, a mapping relation between the PTRS ports and the DMRS ports (i.e., the uplink transmission data layers) may be indicated through an additional bit.

For the non-coherent transmission or semi-coherent transmission, at first the DMRS ports corresponding to the SRS ports 0 and 2 may be associated with the PTRS port 0, and the DMRS ports corresponding to the SRS ports 1 and 3 may be associated with the PTRS port 1. For the PTRS port 0 (or 1), when merely one DMRS port corresponds to the PTRS port 0 (or 1), the additional indication information is unnecessary. When two DMRS ports correspond to the PTRS port 0 (or 1), it is necessary to provide additional one-bit indication information, where "0" represents the mapping of the PTRS port 0 (or 1) to the DMRS port corresponding to a data layer with a smaller serial number, and "1" represents the mapping of the PTRS port 0 (or 1) to the DMRS port corresponding to a data layer with a larger serial number.

To be specific, (1) when the quantity of the PTRS ports is 2, the quantity of the SRS ports is 2, and the quantity of the supported maximum transmission layers is 2, the mapping of the PTRS ports may not be indicated through an additional bit; (2) when the quantity of the PTRS ports is 2, the quantity of the SRS ports is 4 and the quantity of the supported maximum transmission layers is 2, the mapping of the PTRS ports may not be indicated through an additional bit; (3) when the quantity of the PTRS ports is 1, the quantity of the SRS ports is 4, and the quantity of the supported maximum transmission layers is 2, the mapping of the PTRS ports may be indicated through one additional bit; (4) when the quantity of the PTRS ports is 2, the quantity of the SRS ports is 4, and the quantity of the supported maximum transmission layers is 3, the mapping of the PTRS ports may be indicated through one additional bit; and (5) when the quantity of the PTRS ports is 2, the quantity of the SRS ports is 4, and the quantity of the supported maximum transmission layers is 4, the mapping of the PTRS ports may be indicated through two additional bits.

Figure 3:
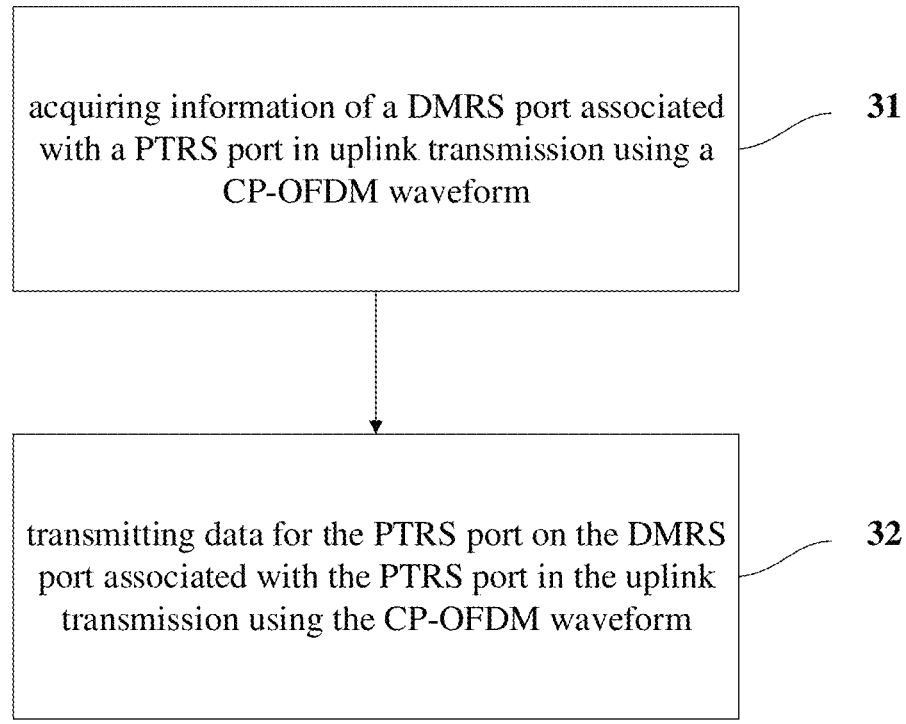
FIG. 3 is a flow chart of a PTRS transmission method according to the embodiments of the present disclosure.

As shown in FIG. 3, the present disclosure further provides in some embodiments a PTRS transmission method for a terminal, which includes: Step 31 of acquiring information of a DMRS port associated with a PTRS port in uplink transmission using a CP-OFDM waveform; and Step 32 of transmitting data for the PTRS port on the DMRS port associated with the PTRS port in the uplink transmission using the CP-OFDM waveform.

The DMRS port associated with the PTRS port may be just a DMRS port for the transmission of data for the PTRS port, and in the embodiments of the present disclosure, it may also be called as a DMRS port to which the PTRS port is mapped.

In the embodiments of the present disclosure, the terminal may accurately acquire the DMRS port associated with the PTRS port, and transmit the data for the PTRS port on the DMRS port associated with the PTRS port.

In the embodiments of the present disclosure, the information of the DMRS port associated with the PTRS port may be a serial number of the DMRS port associated with the PTRS port. Naturally, apart from the serial number, the DMRS port may also be indicated using the other information, e.g., a serial number of a certain data layer in the uplink transmission.

In the embodiments of the present disclosure, the information of the DMRS port associated with the PTRS port may be predefined in a protocol, or configured by a network device. In other words, the acquiring the information of the DMRS port associated with the PTRS port in the uplink transmission using the CP-OFDM waveform may include: receiving the indication information transmitted by the network device, the indication information being used to indicate the information of the DMRS port associated with the PTRS port in the uplink transmission using the CP-OFDM waveform to the terminal; or acquiring the information of the DMRS port associated with the PTRS port in the uplink transmission using the CP-OFDM waveform predefined in the protocol.

A mode where the information is predefined in a protocol is an implicit indication mode, and a mode where the information is configured by the network device is an explicit indication mode.

In the embodiments of the present disclosure, when different transmission modes are adopted for the uplink transmission, the indication information may be transmitted to the terminal in different indication modes.

In some embodiments of the present disclosure, when the uplink transmission is non-codebook-based transmission, the information of the DMRS port associated with the PTRS port in the uplink transmission using the CP-OFDM waveform predefined in the protocol may include a DMRS port with a minimum or maximum serial number in all the DMRS ports corresponding to the PTRS port.

In some embodiments of the present disclosure, when the uplink transmission is the non-codebook-based transmission, the receiving the indication information transmitted by the network device may include receiving the indication information transmitted by the network device when the PTRS ports corresponding to at least two SRS resources are the same one PTRS port.

To be specific, the receiving the indication information transmitted by the network device when the PTRS ports corresponding to at least two SRS resources are the same may include one of: (1) when the quantity of the PTRS ports is 1 and the quantity of the DMRS ports is 2, receiving the indication information transmitted by the network device through one bit; and (2) when the quantity of the PTRS ports is 1 or 2 and the quantity of the DMRS ports is 4, receiving the indication information transmitted by the network device through two bits.

In some other embodiments of the present disclosure, when the uplink transmission is codebook-based transmission, the receiving the indication information transmitted by the network device may include: receiving a correspondence between the DMRS ports and the PTRS ports transmitted by the network device through a TPMI and a TRI; and receiving the indication information transmitted by the network device in accordance with the TPMI and the TRI.

The uplink transmission may include three types, i.e., full-coherent transmission, semi-coherent transmission and non-coherent transmission. The network device may transmit the indication information to the terminals supporting different transmission types in different modes, which will be illustratively described hereinafter.

With respect to the terminal that supports the full-coherent transmission, the receiving the indication information transmitted by the network device in accordance with the TPMI and the TRI may include one of: (1) when the TRI is 2, receiving the indication information transmitted by the network device through one bit; and (2) when the TRI is 3 or 4, receiving the indication information transmitted by the network device through two bits.

With respect to the terminal that supports the non-coherent or semi-coherent transmission, the receiving the indication information transmitted by the network device in accordance with the TPMI and the TRI may include at least one of: (1) when the quantity Tx of transmission antennae is 4, the TRI is 2, the TPMI is 1 or 4 and the quantity of the PTRS ports is 1, receiving the indication information transmitted by the network device through one bit; (2) when the quantity Tx of transmission antennae is 4, the TRI is 3, the TPMI is 0, 1 or 4, and the quantity of the PTRS ports is 2, receiving the indication information transmitted by the network device through one bit; and (3) when the quantity Tx of transmission antennae is 4, the TRI is 4, the TPMI is 0, 1 or 2, and the quantity of the PTRS ports is 2, receiving the indication information transmitted by the network device through two bits.

In the embodiments of the present disclosure, the receiving the indication information transmitted by the network device may include receiving the indication information transmitted by the network device through DCI.

Figure 4:
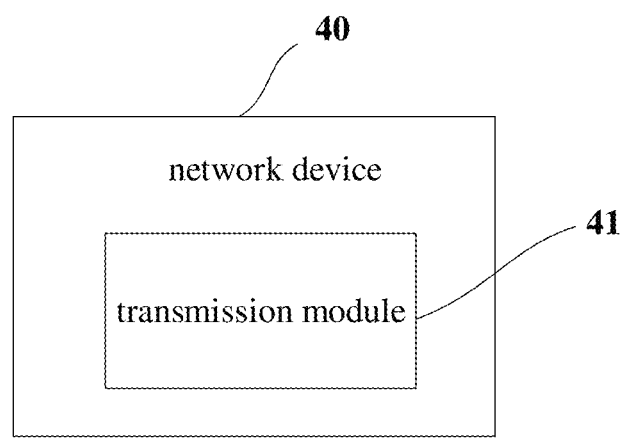
FIG. 4 is a schematic view showing a network device according to the embodiments of the present disclosure.

Based on a same inventive concept, as shown in FIG. 4, the present disclosure further provides in some embodiments a network device 40, which includes a transmission module 41 used to transmit indication information to a terminal, the indication information being used to indicate information of a DMRS port associated with a PTRS port in uplink transmission using a CP-OFDM waveform to a terminal.

According to the embodiments of the present disclosure, the network device may transmit the indication information to the terminal, and the indication information may be used to indicate the information of the DMRS port associated with the PTRS port in the uplink transmission using the CP-OFDM waveform to the terminal, so that the terminal may transmit the data of the PTRS port on the DMRS port associated with the PTRS port and indicated by the network device in the uplink transmission using the CP-OFDM waveform. As a result, it is able for the network device to accurately acquire the DMRS port for the transmission of a PTRS and receive the PTRS via the DMRS port, thereby to accurately estimate a phase noise.

In a possible embodiment of the present disclosure, when the uplink transmission is non-codebook-based transmission, the transmission module 41 is further used to: transmit a correspondence between SRS resources and PTRS ports to the terminal through RRC signaling; and when the PTRS ports corresponding to at least two SRS resources are the same one PTRS port, transmit the indication information to the terminal.

In a possible embodiment of the present disclosure, the transmission module 41 may include at least one of: a first transmission sub-module used to, when the quantity of the PTRS ports is 1 and the quantity of the DMRS ports is 2, transmit the indication information to the terminal through one bit; a second transmission sub-module used to, when the quantity of the PTRS ports is 2 and the quantity of the DMRS ports is 2, not transmit the indication information to the terminal; and a third transmission sub-module used to, when the quantity of the PTRS ports is 1 or 2 and the quantity of the DMRS ports is 4, transmit the indication information to the terminal through two bits.

In some other embodiments of the present disclosure, when the uplink transmission is codebook-based transmission, the transmission module 41 is further used to: transmit a correspondence between the PTRS ports and DMRS ports to the terminal through a TPI and a TRI; and transmit the indication information to the terminal in accordance with the TPMI and the TRI.

In a possible embodiment of the present disclosure, the transmission module 41 may include a first processing sub-module used to, when the TRI is 1, not transmit the indication information to the terminal.

With respect to the terminal that supports full-coherent transmission, the transmission module 41 may include at least one of: a fourth transmission sub-module used to, when the TRI is 2, transmit the indication information to the terminal through one bit; and a fifth transmission sub-module used to, when the TRI is 3 or 4, transmit the indication information to the terminal through two bits.

With respect to the terminal that supports non-coherent transmission or semi-coherent transmission, the transmission module 41 may include at least one of: a second processing sub-module used to, when the quantity Tx of transmission antennae is 2, the TRI is 2, the TPMI is 0 and the quantity of the PTRS ports is 2, not transmit the indication information to the terminal; a third processing sub-module used to, when the quantity Tx of the transmission antennae is 4, the TRI is 2, the TPMI is 0, 2, 3, 5, 6, 7, 8, 9, 10, 11, 12 or 13, and the quantity of the PTRS ports is 2, not transmit the indication information to the terminal; a sixth transmission sub-module used to, when the quantity Tx of the transmission antennae is 4, the TRI is 2, the TPMI is 1 or 4 and the quantity of the PTRS ports is 1, transmit the indication information to the terminal through one bit; a seventh transmission sub-module used to, when the quantity Tx of the transmission antennae is 4, the TRI is 3, the TPMI is 0, 1 or 2, and the quantity of the PTRS ports is 2, transmit the indication information to the terminal through one bit; and an eighth transmission sub-module used to, when the quantity Tx of the transmission antennae is 4, the TRI is 4, the TPMI is 0, 1 or 2, and the quantity of the PTRS ports is 2, transmit the indication information to the terminal through two bits.

In a possible embodiment of the present disclosure, the transmission module 41 is further used to transmit the indication information to the terminal through DCI.

In a possible embodiment of the present disclosure, the transmission module 41 is further used to transmit the correspondence between the PTRS ports and the DMRS ports in accordance with the quantity of SRS ports, the quantity of the PTRS ports, and the quantity of supported maximum transmission layers.

In a possible embodiment of the present disclosure, when the quantity of the supported maximum transmission layers is 1, mapping of the PTRS ports may not be indicated through an additional bit.

In a possible embodiment of the present disclosure, with respect to the terminal that supports the full-coherent transmission, the transmission module 41 may include at least one of: a ninth transmission sub-module used to, when the quantity of the PTRS ports is 1 and the quantity of the supported maximum transmission layers is 2, transmit the indication information to the terminal through one bit; and a tenth transmission sub-module used to, when the quantity of the PTRS ports is 1 and the quantity of the supported maximum transmission layers is 3 or 4, transmit the indication information to the terminal through two bits.

In a possible embodiment of the present disclosure, with respect to the terminal that supports the semi-coherent transmission or the non-coherent transmission, the transmission module 41 may include at least one of: a fourth processing sub-module used to, when the quantity of the PTRS ports is 2, the quantity of the SRS ports is 2, and the quantity of the supported maximum transmission layers is 2, not indicate the mapping of the PTRS ports through an additional bit; a fifth processing sub-module used to, when the quantity of the PTRS ports is 2, the quantity of the SRS ports is 4, and the quantity of the supported maximum transmission layers is 2, not indicate the mapping of the PTRS ports through an additional bit; an eleventh transmission sub-module used to, when the quantity of the PTRS ports is 1, the quantity of the SRS ports is 4, and the quantity of the supported maximum transmission layers is 2, transmit the indication information to the terminal through one bit; a twelfth transmission sub-module used to, when the quantity of the PTRS ports is 2, the quantity of the SRS ports is 4, and the quantity of the supported maximum transmission layers is 3, transmit the indication information to the terminal through one bit; and a thirteenth transmission sub-module used to, when the quantity of the PTRS ports is 2, the quantity of the SRS ports is 4, and the quantity of the supported maximum transmission layers is 4, transmit the indication information to the terminal through two bits.

Figure 5:
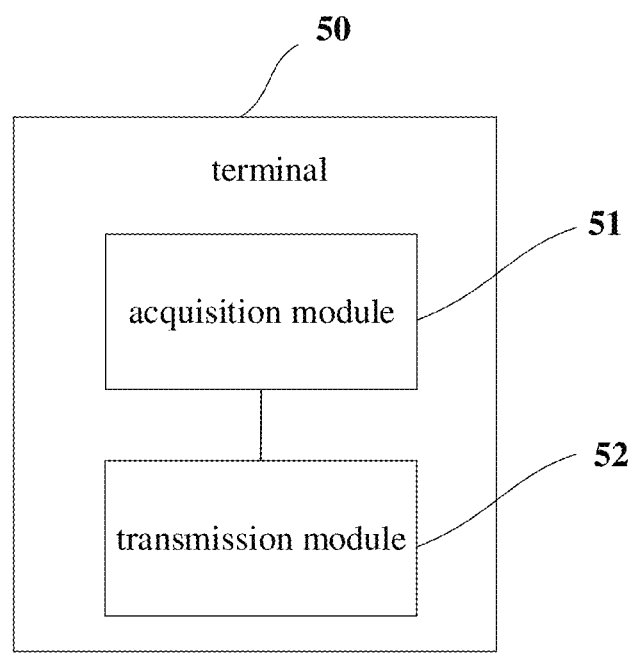
FIG. 5 is a schematic view showing a terminal according to the embodiments of the present disclosure.

As shown in FIG. 5, the present disclosure further provides in some embodiments a terminal 50, which includes: an acquisition module 51 used to acquire information of a DMRS port associated with a PTRS port in uplink transmission using a CP-OFDM waveform; and a transmission module 52 used to transmit data for the PTRS port on the DMRS port associated with the PTRS port in the uplink transmission using the CP-OFDM waveform.

In the embodiments of the present disclosure, the terminal may accurately acquire the DMRS port associated with the PTRS port, and transmit the data for the PTRS port on the DMRS port associated with the PTRS port.

The acquisition module 51 is further used to: receive indication information transmitted by a network device, the indication information being used to indicate the information of the DMRS port associated with the PTRS port in the uplink transmission using the CP-OFDM waveform to the terminal; or acquire the information of the DMRS port associated with the PTRS port in the uplink transmission using the CP-OFDM waveform predefined in the protocol.

In some embodiments of the present disclosure, when the uplink transmission is non-codebook-based transmission, the information of the DMRS port associated with the PTRS port in the uplink transmission using the CP-OFDM waveform predefined in the protocol may include a DMRS port with a minimum or maximum serial number in all the DMRS ports corresponding to the PTRS port.

In some embodiments of the present disclosure, when the uplink transmission is the non-codebook-based transmission, the acquisition module 51 is further used to receive the indication information transmitted by the network device when the PTRS ports corresponding to at least two SRS resources are the same one PTRS port.

In a possible embodiment of the present disclosure, the acquisition module 51 may include at least one of: a first reception sub-module used to, when the quantity of the PTRS ports is 1 and the quantity of the DMRS ports is 2, receive the indication information transmitted by the network device through one bit; and a second reception sub-module used to, when the quantity of the PTRS ports is 1 or 2 and the quantity of the DMRS ports is 4, receive the indication information transmitted by the network device through two bits.

In some embodiments of the present disclosure, when the uplink transmission is codebook-based transmission, the acquisition module 51 is further used to: receive a correspondence between the DMRS ports and the PTRS ports transmitted by the network device through a TPMI and a TRI; and receive the indication information transmitted by the network device in accordance with the TPMI and the TRI.

With the terminal that supports full-coherent transmission, the acquisition module 51 may include at least one of: a third reception sub-module used to, when the TRI is 2, receive the indication information transmitted by the network device through one bit; and a fourth reception sub-module used to, when the TRI is 3 or 4, receive the indication information transmitted by the network device through two bits.

With respect to the terminal that supports non-coherent transmission or semi-coherent transmission, the acquisition module 51 may include at least one of: a fifth reception sub-module used to, when the quantity Tx of transmission antennae is 4, the TRI is 2, the TPMI is 1 or 4 and the quantity of the PTRS ports is 1, receive the indication information transmitted by the network device through one bit; a sixth reception sub-module used to, when the quantity Tx of transmission antennae is 4, the TRI is 3, the TPMI is 0, 1 or 2, and the quantity of the PTRS ports is 2, receive the indication information transmitted by the network device through one bit; and a seventh reception sub-module used to, when the quantity Tx of transmission antennae is 4, the TRI is 4, the TPMI is 0, 1 or 2, and the quantity of the PTRS ports is 2, receive the indication information transmitted by the network device through two bits.

In a possible embodiment of the present disclosure, the acquisition module 51 is further used to receive the indication information transmitted by the network device through DCI.

In a possible embodiment of the present disclosure, when the uplink transmission is the codebook-based transmission, the acquisition module 51 is further used to receive the correspondence between the PTRS ports and the DMRS ports in accordance with the quantity of SRS ports, the quantity of the PTRS ports, and the quantity of supported maximum transmission layers.

In a possible embodiment of the present disclosure, when the quantity of the supported maximum transmission layers is 1, mapping of the PTRS port may not be indicated through an additional bit.

In a possible embodiment of the present disclosure, with respect to the terminal that supports the full-coherent transmission, the acquisition module 51 may include at least one of: an eighth reception sub-module used to, when the quantity of the PTRS ports is 1 and the quantity of the supported maximum transmission layers is 2, receive the indication information through one bit; and a ninth reception sub-module used to, when the quantity of the PTRS ports is 1 and the quantity of the supported maximum transmission layers is 3 or 4, receive the indication information through two bits.

In a possible embodiment of the present disclosure, with respect to the terminal that supports the semi-coherent transmission or the non-coherent transmission, the acquisition module 51 may include at least one of: a first processing sub-module used to, when the quantity of the PTRS ports is 2, the quantity of the SRS ports is 2, and the quantity of the supported maximum transmission layers is 2, not indicate the mapping of the PTRS ports through an additional bit; a second processing sub-module used to, when the quantity of the PTRS ports is 2, the quantity of the SRS ports is 4, and the quantity of the supported maximum transmission layers is 2, not indicate the mapping of the PTRS ports through an additional bit; a tenth reception sub-module used to, when the quantity of the PTRS ports is 1, the quantity of the SRS ports is 4, and the quantity of the supported maximum transmission layers is 2, receive the indication information through one bit; an eleventh reception sub-module used to, when the quantity of the PTRS ports is 2, the quantity of the SRS ports is 4, and the quantity of the supported maximum transmission layers is 3, receive the indication information through one bit; and a twelfth reception sub-module used to, when the quantity of the PTRS ports is 2, the quantity of the SRS ports is 4, and the quantity of the supported maximum transmission layers is 4, receive the indication information through two bits.

The present disclosure further provides in some embodiments a network device, which includes a processor, a memory, and a computer program stored in the memory and capable of being executed by the processor. The processor is used to execute the computer program so as to implement the above-mentioned PTRS association indication method.

The present disclosure further provides in some embodiments a terminal, which includes a processor, a memory, and a computer program stored in the memory and capable of being executed by the processor. The processor is used to execute the computer program so as to implement the above-mentioned PTRS transmission method.

The present disclosure further provides in some embodiments a computer-readable storage medium storing therein a computer program. The computer program is capable of being executed by a processor to implement the above-mentioned PTRS association indication method.

The present disclosure further provides in some embodiments a computer-readable storage medium storing therein a computer program. The computer program is capable of being executed by a processor to implement the above-mentioned PTRS transmission method.

The computer-readable storage medium may be a Read-Only Memory (ROM), a Random Access Memory (RAM), a magnetic disk or an optical disk.

Figure 6:
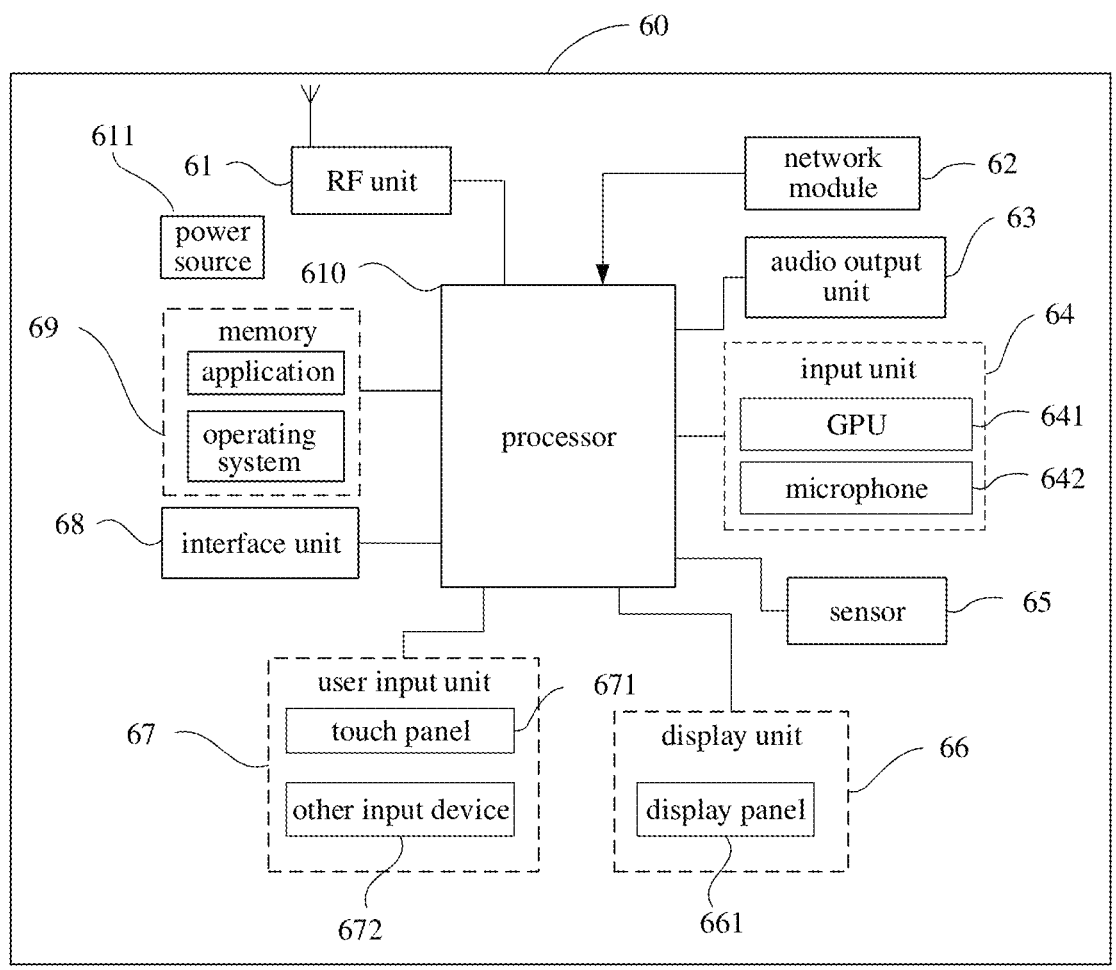
FIG. 6 is a schematic view showing a hardware structure of a mobile terminal according to the embodiments of the present disclosure.

The present disclosure further provides in some embodiments a mobile terminal 60 which, as shown in FIG. 6, includes, but not limited to, an Radio Frequency (RF) unit 61, a network module 62, an audio output unit 63, an input unit 64, a sensor 65, a display unit 66, a user input unit 67, an interface unit 68, a memory 69, a processor 610, and a power source 611. It should be appreciated that, the structure in FIG. 6 shall not be construed as limiting the mobile terminal. The mobile terminal may include more or fewer members, or some members may be combined, or the mobile terminal may include some other members not shown in FIG. 6. In the embodiments of the present disclosure, the mobile terminal may include, but not limited to, mobile phone, flat-panel computer, notebook computer, palm computer, vehicle-mounted terminal, wearable device or pedometer.

The RF unit 61 or the processor 610 is used to acquire information of a DMRS port associated with a PTRS port in uplink transmission using a CP-OFDM waveform. The RF unit 61 is used to transmit data for the PTRS port on the DMRS port associated with the PTRS port in the uplink transmission using the CP-OFDM waveform.

It should be appreciated that, in the embodiments of the present disclosure, the RF unit 61 is used to transmit and receive signals during the information transmission or phone call. To be specific, the RF unit 61 may, upon the receipt of downlink data from the network device, transmit the downlink data to the processor 610 for subsequent treatment. In addition, the RF unit 61 may transmit uplink data to the network device. Usually, the RF unit 61 may include, but not limited to, an antenna, at least one amplifier, a transceiver, a coupler, a low-noise amplifier and a duplexer. In addition, the RF unit 61 may communicate with a network and the other devices via a wireless communication system.

The network module 62 of the UE is used to enable the UE to access the broadband Internet in a wireless manner, e.g., help a user to receive and send an e-mail, browse a web page or access a streaming media.

The audio output unit 63 is used to convert audio data received by the RF unit 61 or the network module 62, or audio data stored in the memory 69, into an audio signal and output the audio signal as a sound. In addition, the audio output unit 63 is further used to provide an audio output related to a specific function executed by the UE 60 (e.g., a sound occurring when a calling signal or a message has been received). The audio output unit 63 may include, e.g., a loudspeaker, a buzzer and a receiver.

The input unit 64 is used to receive an audio or video signal. It may include a Graphics Processing Unit (GPU) 641 and a microphone 642. The GPU 641 is used to process image data of a static image or video acquired by an image collection unit (e.g., a camera) in a video capturing mode or an image capturing mode, and a processed image frame may be displayed by the display unit 36. The image frame processed by the GPU 641 may be stored in the memory 69 (or another storage medium) or transmitted via the RF unit 61 or network module 62. The microphone 642 is used to receive a sound, and convert the sound into voice data. In a call mode, the processed audio data may be converted into data in a format capable of being transmitted by the RF unit 61 to a mobile communication network device.

The at least one sensor 65 included in the UE 65 may be a light sensor, a movement sensor and or other sensors. To be specific, the light sensor may include an ambient light sensor or a proximity sensor. The ambient light sensor is used to adjust a brightness value of a display panel 661 in accordance with ambient light. The proximity sensor is used to turn off the display panel 661 and/or a backlight source when the mobile terminal 60 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the mobile terminal (e.g., perform a switching operation between portrait and landscape orientations, play relevant games, and calibrate a posture of a magnetometer), and perform vibration-related functions (e.g., count steps and strikes). The sensor 65 may further include a fingerprint sensor, a pressure sensor, an iris sensor, a molecule sensor, a gyroscope, a barometer, a hygrometer, a thermometer or an infrared sensor, which will not be particularly defined herein.

The display unit 66 is used to display information inputted by the user or provided to the user. The display unit 66 may include the display panel 661, e.g., a Liquid Crystal Display (LCD) panel, or an Organic Light-Emitting Diode (OLED) panel.

The user input unit 67 is used to receive digital or character information inputted by the user, and generate a key signal input related to user settings and function control of the mobile terminal. To be specific, the user input unit 67 may include a touch panel 671 and another input device 672. The touch panel 671, also called as touch screen, is used to collect a touch operation made by the user on or in proximity to the touch panel (e.g., an operation made by the user through any appropriate object or attachment (e.g., finger or stylus) on or in the proximity to the touch panel 671). The touch panel 671 may include a touch detection device and a touch controller. The touch detection device is used to detect a touch position of the user and a signal generated due to the touch operation, and transmit the signal to the touch controller. The touch controller is used to receive touch information from the touch detection device, convert it into coordinates of a touch point, transmit the coordinates to the processor 610, and receive and execute a command from the processor 610. In addition, the touch panel 671 may be of a resistive type, a capacitive type, an infrared type or a Surface Acoustic Wave (SAW) type. In addition to the touch panel 671, the user input unit 67 may further other input device 672 including, but not limited to, a physical keyboard, a functional button (e.g., a volume control button or an on/off button), a trackball, a mouse, and a joystick, which will not be particularly defined herein.

Further, the touch panel 671 may cover the display panel 661. When the touch operation made on or in proximity to the touch panel 671 has been detected by the touch panel 671, the touch panel 671 may transmit the touch information to the processor 610, so as to determine a type of a touch event. Then, the processor 610 may control the display panel 661 to provide a corresponding visual output in accordance with the type of the touch event. Although the touch panel 671 and the display panel 661 are configured as two separate members to achieve the input and the output functions of the UE in FIG. 6, in some embodiments of the present disclosure, they may be integrated so as to achieve the input and output functions of the mobile device, which will not be particularly defined herein.

The interface unit 68 is used to provide an interface between an external device and the mobile terminal 60. For example, the external device may include a wired or wireless headset port, an external power source port (or a charging port), a wired or wireless data port, a memory card port, a port for connecting a device having an identification module, an audio Input/Output (I/O) port, a video I/O port, and an earphone port. The interface unit 68 is used to receive an input from the external device (e.g., data information and electricity) and transmit the received input to one or more elements of the mobile terminal 60, or transmit data between the mobile terminal 60 and the external device.

The memory 69 is used to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and phone book) may be stored in the data storage area. In addition, the memory 69 may include a high-speed Random Access Memory (RAM), or a non-volatile memory (e.g., at least one magnetic disk or flash memory), or any other volatile solid state memory.

As a control center of the mobile terminal, the processor 610 may be connected to the various members of the mobile terminal via various interfaces and circuits, and used to run or execute the software program and/or module stored in the memory 69, and call the data stored in the memory 69, so as to execute the functions of the mobile terminal and process the data, thereby to monitor the entire mobile terminal. The processor 610 may include one or more processing units. Preferably, an application processor and a modem may be integrated into the processor 610. The application processor is mainly used to process the operating system, a user interface, the application, and the like. The modem is mainly used to process wireless communication. It should be appreciated that, the modem may also not be integrated into the processor 610.

The power source 611 (e.g., a battery) is used to supply power to the members of the mobile terminal 60. Preferably, the power source 611 is logically connected to the processor 610 via a power source management system, so as to achieve such functions as charging, discharging and power consumption management through the power source management system.

In addition, the mobile terminal 60 may include some functional modules not shown in FIG. 6, which will not be particularly defined herein.

It should be appreciated that, such words as "include" or "including" or any other variations involved in the present disclosure intend to provide non-exclusive coverage, so that a procedure, method, article or device including a series of elements may also include other elements not listed herein, or may include inherent elements of the procedure, method, article or device. If without any further limitations, for the elements defined by such sentence as "including one . . . ", it is not excluded that the procedure, method, article or device including the elements may also include other identical elements.

Through the above-mentioned description, it may be apparent for a person skilled in the art that the methods of the embodiments may be implemented by software as well as a necessary common hardware platform, or by hardware, and the former may be better in most cases. Based on this, the technical solutions of the present disclosure, essentially, or parts of the technical solutions of the present disclosure contributing to the prior art, may appear in the form of software products, which may be stored in a storage medium (e.g., ROM/RAM, magnetic disk or optical disk) and include several instructions so as to enable a terminal device (e.g., mobile phone, computer, server, air conditioner or network device) to execute the method in the embodiments of the present disclosure.

The embodiments of the present disclosure have been described above with reference to the drawings, but the present disclosure is not limited to the above-mentioned specific implementations. The above-mentioned specific implementations are merely schematic, rather than limiting. Under the teaching of the present disclosure, a person skilled in the art may make further modifications without departing from the principle of the present disclosure and the scope of claims, and these modifications shall also fall within the scope of the present disclosure.

What is claimed is:

1. A Phase Tracking Reference Signal (PTRS) association indication method for a network device, comprising:
transmitting indication information to a terminal, the indication information being used to indicate information of a DeModulation Reference Signal (DMRS) port to the terminal, the DMRS port being associated with a PTRS port in uplink transmission using a Cyclic Prefix-Orthogonal Frequency Division Multiplexing (CP-OFDM) waveform,
wherein when the uplink transmission is non-codebook-based transmission, the transmitting the indication information to the terminal comprises:
transmitting the indication information to the terminal when PTRS ports corresponding to at least two Sounding Reference Signal (SRS) resources are a same one PTRS port.

2. The PTRS association indication method according to claim 1, wherein the transmitting the indication information to the terminal when the PTRS ports corresponding to the at least two SRS resources are same comprises one of:
when the quantity of the PTRS ports is 1 and the quantity of the DMRS ports is 2, transmitting the indication information to the terminal through one bit;
when the quantity of the PTRS ports is 2 and the quantity of the DMRS ports is 2, not transmitting the indication information to the terminal;
when the quantity of the PTRS ports is 1 or 2 and the quantity of the DMRS ports is 4, transmitting the indication information to the terminal through two bits.

3. The PTRS association indication method according to claim 1, wherein when the uplink transmission is codebook-based transmission, the transmitting the indication information to the terminal comprises:
transmitting a correspondence between the PTRS ports and the DMRS ports to the terminal through a Transmit Precoding Matrix Indicator (TPMI) and a Transmit Rank Indicator (TRI);
transmitting the indication information to the terminal in accordance with the TPMI and the TRI.

4. The PTRS association indication method according to claim 3, wherein the transmitting the indication information to the terminal in accordance with the TPMI and the TRI comprises:
when the TRI is 1, not transmitting the indication information to the terminal.

5. The PTRS association indication method according to claim 3, wherein with respect to the terminal that supports full-coherent transmission, the transmitting the indication information to the terminal in accordance with the TPMI and the TRI comprises at least one of:
when the TRI is 2, transmitting the indication information to the terminal through one bit;
when the TRI is 3 or 4, transmitting the indication information to the terminal through two bits.

6. The PTRS association indication method according to claim 3, wherein with respect to the terminal supports non-coherent transmission or semi-coherent transmission, the transmitting the indication information to the terminal in accordance with the TPMI and the TRI comprises one of:
when the quantity Tx of transmission antennae is 2, the TRI is 2, the TPMI is 0, and the quantity of the PTRS ports is 2, not transmitting the indication information to the terminal;
when the quantity Tx of the transmission antennae is 4, the TRI is 2, the TPMI is 0, 2, 3, 5, 6, 7, 8, 9, 10, 11, 12 or 13, and the quantity of the PTRS ports is 2, not transmitting the indication information to the terminal;
when the quantity Tx of the transmission antennae is 4, the TRI is 2, the TPMI is 1 or 4, and the quantity of the PTRS ports is 1, transmitting the indication information to the terminal through one bit;
when the quantity Tx of the transmission antennae is 4, the TRI is 3, the TPMI is 0, 1 or 2, and the quantity of the PTRS ports is 2, transmitting the indication information to the terminal through one bit;
when the quantity Tx of the transmission antennae is 4, the TRI is 4, the TPMI is 0, 1 or 2, and the quantity of the PTRS ports is 2, transmitting the indication information to the terminal through two bits.

7. The PTRS association indication method according to claim 1, wherein when the uplink transmission is codebook-based transmission, the transmitting the indication information to the terminal comprises:
transmitting the correspondence between the PTRS ports and the DMRS ports to the terminal in accordance with the quantity of SRS ports, the quantity of the PTRS ports, and the quantity of supported maximum transmission layers.

8. The PTRS association indication method according to claim 7, wherein when the quantity of the supported maximum transmission layers is 1, mapping of the PTRS ports is not indicated through an additional bit.

9. The PTRS association indication method according to claim 7, wherein with respect to the terminal that supports full-coherent transmission, the transmitting the correspondence between the PTRS ports and the DMRS ports to the terminal in accordance with the quantity of the SRS ports and the quantity of the supported maximum transmission layers, the transmitting the indication information to the terminal comprises at least one of:
when the quantity of the PTRS ports is 1 and the quantity of the supported maximum transmission layers is 2, transmitting the indication information to the terminal through one bit;
when the quantity of the PTRS ports is 1 and the quantity of the supported maximum transmission layers is 3 or 4, transmitting the indication information to the terminal through two bits.

10. The PTRS association indication method according to claim 7, wherein with respect to the terminal that supports semi-coherent transmission or non-coherent transmission, the transmitting the correspondence between the PTRS ports and the DMRS ports to the terminal in accordance with the quantity of the SRS ports, the quantity of the PTRS ports and the quantity of the supported maximum transmission layers, the transmitting the indication information to the terminal comprises at least one of:
when the quantity of the PTRS ports is 2, the quantity of the SRS ports is 2, and the quantity of the supported maximum transmission layers is 2, not indicating the mapping of the PTRS ports through an additional bit;
when the quantity of the PTRS ports is 2, the quantity of the SRS ports is 4, and the quantity of the supported maximum transmission layers is 2, not indicating the mapping of the PTRS ports through an additional bit;
when the quantity of the PTRS ports is 1, the quantity of the SRS ports is 4, and the quantity of the supported maximum transmission layers is 2, transmitting the indication information to the terminal through one bit;

when the quantity of the PTRS ports is 2, the quantity of the SRS ports is 4, and the quantity of the supported maximum transmission layers is 3, transmitting the indication information to the terminal through one bit;

when the quantity of the PTRS ports is 2, the quantity of the SRS ports is 4, and the quantity of the supported maximum transmission layers is 4, transmitting the indication information to the terminal through two bits.

11. The PTRS association indication method according to claim 1, wherein the transmitting the indication information to the terminal comprises:

transmitting the indication information to the terminal through Downlink Control Information (DCI).

12. A Phase Tracking Reference Signal (PTRS) transmission method for a terminal, comprising:

acquiring information of a DeModulation Reference Signal (DMRS) port associated with a PTRS port in uplink transmission using a Cyclic Prefix-Orthogonal Frequency Division Multiplexing (CP-OFDM) waveform; and transmitting data for the PTRS port on the DMRS port associated with the PTRS port, wherein the acquiring the information of the DMRS port associated with the PTRS port in the uplink transmission using the CP-OFDM waveform comprises:

receiving indication information transmitted by a network device, the indication information being used to indicate to the terminal the information of the DMRS port associated with the PTRS port in the uplink transmission using the CP-OFDM waveform; or acquiring the information of the DMRS port associated with the PTRS port in the uplink transmission using the CP-OFDM waveform, wherein the information of the DMRS port associated with the PTRS port in the uplink transmission using the CP-OFDM waveform is pre-defined in a protocol, wherein when the uplink transmission is non-codebook-based transmission, the information of the DMRS port associated with the PTRS port in the uplink transmission using the CP-OFDM waveform predefined in the protocol comprises: a DMRS port with a minimum or maximum serial number in all the DMRS ports corresponding to the PTRS port.

13. The PTRS transmission method according to claim 12, wherein when the uplink transmission is non-codebook-based transmission, the receiving the indication information transmitted by the network device comprises:

receiving the indication information transmitted by the network device when PTRS ports corresponding to at least two Sounding Reference Signal (SRS) resources are a same one PTRS port.

14. The PTRS transmission method according to claim 13, wherein the receiving the indication information transmitted by the network device when the PTRS ports corresponding to at least two SRS resources are same comprises one of:

when the quantity of the PTRS ports is 1 and the quantity of the DMRS ports is 2, receiving the indication information transmitted by the network device through one bit;

when the quantity of the PTRS ports is 1 or 2 and the quantity of the DMRS ports is 4, receiving the indication information transmitted by the network device through two bits.

15. The PTRS transmission method according to claim 12, wherein when the uplink transmission is codebook-based transmission, the receiving the indication information transmitted by the network device comprises:

receiving a correspondence between the DMRS ports and the PTRS ports transmitted by the network device through a Transmit Precoding Matrix Indicator (TPMI) and a Transmit Rank Indicator (TRI); and receiving the indication information transmitted by the network device in accordance with the TPMI and the TRI.

16. A terminal, comprising a processor, a memory, and a computer program stored in the memory and capable of being executed by the processor, wherein the processor is used to execute the computer program, to implement the PTRS transmission method according to claim 12.

17. A network device, comprising a processor, a memory, and a computer program stored in the memory and capable of being executed by the processor, wherein the processor used to execute the computer program to:

transmit indication information to a terminal, wherein the indication information is used to indicate information of a DeModulation Reference Signal (DMRS) port to the terminal, the DMRS port is associated with a PTRS port in uplink transmission using a Cyclic Prefix-Orthogonal Frequency Division Multiplexing (CP-OFDM) waveform, wherein when the uplink transmission is non-codebook-based transmission, the transmitting the indication information to the terminal comprises:

transmitting the indication information to the terminal when PTRS ports corresponding to at least two Sounding Reference Signal (SRS) resources are a same one PTRS port.

\* \* \* \* \*